US005690982A

United States Patent [19]

Fazzolare et al.

[11] Patent Number: 5,690,982
[45] Date of Patent: *Nov. 25, 1997

[54] BAKED POTATO-BASED CHIP-LIKE SNACK FOODS AND METHOD OF PREPARING

[75] Inventors: Richard D. Fazzolare, Randolph; Joseph A. Szwerc, Mahwah; Richard R. McFeaters, Teaneck, all of N.J.

[73] Assignee: Nabisco Technology Company, Wilmington, Del.

[*] Notice: The term of this patent shall not extend beyond the expiration date of Pat. No. 4,834,996.

[21] Appl. No.: 459,241

[22] Filed: Jun. 2, 1995

Related U.S. Application Data

[63] Continuation of Ser. No. 257,814, Jun. 8, 1994, Pat. No. 5,554,405, which is a continuation of Ser. No. 848,889, Mar. 10, 1992, Pat. No. 5,320,858, which is a continuation of Ser. No. 310,096, Feb. 14, 1989, Pat. No. 5,104,673, which is a continuation of Ser. No. 62,673, Jun. 16, 1987, Pat. No. 4,834,996, which is a continuation-in-part of Ser. No. 772,918, Sep. 5, 1985, Pat. No. 4,873,093, which is a continuation-in-part of Ser. No. 681,647, Dec. 14, 1984, abandoned.

[51] Int. Cl.$^6$ .................. A23L 1/164; A23L 1/217
[52] U.S. Cl. .................. 426/550; 426/560; 426/808
[58] Field of Search .................. 426/549, 550, 426/560, 637, 502, 808, 804

[56] References Cited

U.S. PATENT DOCUMENTS

| 678,749 | 7/1901 | Moore et al. |
| 1,039,912 | 10/1912 | Dollings . |
| 1,169,023 | 1/1916 | Embrey . |
| 1,975,326 | 10/1934 | Loose et al. |
| 2,204,045 | 6/1940 | Meacham . |
| 2,505,407 | 4/1950 | Johnson . |
| 2,584,893 | 2/1952 | Lloyd et al. |
| 2,704,257 | 3/1955 | Diez de Sollano et al. |
| 2,767,667 | 10/1956 | Spooner . |
| 2,823,625 | 2/1958 | Oakes .................. 426/502 |
| 2,905,559 | 9/1959 | Anderson et al. .......... 426/502 X |

(List continued on next page.)

FOREIGN PATENT DOCUMENTS

| 637258 | 2/1962 | Canada . |
| 0184964 | 6/1986 | European Pat. Off. .......... 426/808 |
| 2267049 | 11/1975 | France . |
| 2604716 | 8/1976 | Germany . |
| 59-001786 | 1/1979 | Japan . |
| 54-32056 | 10/1979 | Japan . |
| 55-108250 | 8/1980 | Japan . |
| 59-031642 | 2/1984 | Japan . |
| 60-168361 | 8/1985 | Japan . |
| 60-244256 | 12/1985 | Japan . |
| 61-202658 | 9/1986 | Japan . |
| 370933 | 11/1973 | U.S.S.R. . |
| 107218 | 6/1917 | United Kingdom . |
| 1525631 | 9/1978 | United Kingdom . |
| 2111816 | 7/1983 | United Kingdom . |

OTHER PUBLICATIONS

Encyclopedia of Food Technology, vol. 2, pp. 263–267, (1974), The AVI Publishing Company, Inc.

Cerletti, et al., "Maize Germ Proteins, Their Composition, Nutritive Value and Functional Properties", Proc. Int. Assoc. Cereal Chem. Symp. Amino Acid Composition and Biological Value of Cereal Proteins, Budapest, Hungary 1983, R. Lasztity, M. Hidvegi, eds.

Chemical Abstract #58556d of 17—Foods. vol. 80, 1974.

Tressler, Donald K. Ph.D., Food Products Formulary, vol. 2, Cereals, Baked Goods, Dairy and Egg Products, The AVI Publ. Co., Westport, CT., pp. 103–104 (1975).

"Low–Calorie, Baked Snack . . . 'Potato Pips'", Engineered Foods Magazine, p. 58 (Aug. 8, 1984).

Pyler, E.J., "Baking Science and Technology", Siebel Publ. Co., Chicago, IL, 1973, pp. 428–429.

Matz, S.A., Cookie and Cracker Technology, The AVI Publ. Co., Chapter 18, pp. 238–253 (1968).

Matz, S.A., Cookie and Cracker Technology, The AVI Publ. Co., pp. 265–266 (1968).

Pyler, E.J., Baking Science & Technology, Sosland Publishing Co., Merriam, KS, 1988, pp. 1061–1062, 913, and 609.

Foods and Food Preparation Encyclopedia, Van Nostrand Reinhold Co., Inc., NY, NY, 1982, pp. 282–284.

Pesrosier, N.W., Elements of Food Technology, AVI Publ. Co., Inc., Westport, Conn., 1977, pp. 479–482 and 468–469.

Kotschevar, L.H., Standards, Principals, and Techniques in Quality Food Production, Van Nostrad Reinhold, NY, NY, 1988, pp. 404–407.

Whistler, et al., Starch: Chemistry and Technology, Academic Press, Inc., pp. 588–590 (1984).

Matz, Cookie and Cracker Technology, 2nd ed., The AVI Publ. Co., Inc. (1968), pp. 11–12.

Atwell, et al., "The Terminology and Methodology Associated With Basic Starch Phenomena", Cereal Food World, vol. 33, No. 3, 1968, pp. 306–311.

Primary Examiner—Arthur L. Corbin

[57] ABSTRACT

The invention is a continuous process and a product of the process for preparing a low fat content chip-like baked snack food from a composition containing at least one ingredient having starch. Water and the ingredient having starch comprise substantially all of the ingredients of the composition. The method involves mixing and heating the composition in a cooker extruder or continuous mixer to form a dough-like consistency. In the most preferred embodiments of the invention the ingredient including starch is a corn and a potato ingredient. The formed composition is sheeted and the sheeted composition is then laminated, educed in thickness, formed into pieces, and baked in a conventional oven. During baking the exterior layer of the dough cooks rapidly and traps steam in the interior portion of the dough. Blisters and curls result in the final product that impart a chip-like appearance to the final product. An alternative embodiment includes applying a spray oil to the pieces before baking to obtain a final product having a flat cracker-like appearance.

37 Claims, No Drawings

U.S. PATENT DOCUMENTS

| | | | |
|---|---|---|---|
| 3,027,258 | 3/1962 | Markakis et al. | 426/560 X |
| 3,089,773 | 5/1963 | Bates et al. | |
| 3,194,664 | 7/1965 | Eytinge. | |
| 3,276,397 | 10/1966 | Poppe et al. | |
| 3,278,311 | 10/1966 | Brown et al. | 426/560 |
| 3,332,781 | 7/1967 | Benson et al. | |
| 3,348,950 | 10/1967 | Weiss. | |
| 3,384,495 | 5/1968 | Potter et al. | |
| 3,451,822 | 6/1969 | Fast et al. | 426/808 X |
| 3,493,390 | 2/1970 | Succo. | |
| 3,519,432 | 7/1970 | Succo et al. | |
| 3,539,356 | 11/1970 | Benson et al. | |
| 3,545,979 | 12/1970 | Ghafoori. | |
| 3,600,193 | 8/1971 | Glabe. | |
| 3,615,658 | 10/1971 | Glabe. | |
| 3,615,697 | 10/1971 | Hollenbeck. | |
| 3,652,294 | 3/1972 | Marotta et al. | |
| 3,690,895 | 9/1972 | Amadon et al. | 426/502 X |
| 3,698,309 | 10/1972 | Steels. | |
| 3,698,914 | 10/1972 | Kortschot et al. | |
| 3,698,915 | 10/1972 | Glasgow. | |
| 3,753,729 | 8/1973 | Harms et al. | |
| 3,753,735 | 8/1973 | Gerkens. | |
| 3,800,050 | 3/1974 | Popel. | |
| 3,821,441 | 6/1974 | Tomita et al. | |
| 3,857,982 | 12/1974 | Sevenants. | |
| 3,860,735 | 1/1975 | Hoshino. | |
| 3,864,505 | 2/1975 | Hunter et al. | |
| 3,873,748 | 3/1975 | Schwab et al. | |
| 3,886,291 | 5/1975 | Willard. | |
| 3,922,370 | 11/1975 | Prakash. | |
| 3,925,567 | 12/1975 | Abe. | |
| 3,935,322 | 1/1976 | Weiss et al. | |
| 3,937,848 | 2/1976 | Campbell et al. | |
| 3,946,116 | 3/1976 | Weaver et al. | |
| 3,956,517 | 5/1976 | Curry et al. | |
| 3,982,032 | 9/1976 | Koizumi. | |
| 3,988,875 | 11/1976 | Fay. | |
| 3,997,684 | 12/1976 | Willard. | |
| 3,998,975 | 12/1976 | Liepa | 426/550 |
| 4,005,139 | 1/1977 | Kortschot. | |
| 4,044,166 | 8/1977 | Koizumi. | |
| 4,073,958 | 2/1978 | Abe. | |
| 4,109,012 | 8/1978 | Bates et al. | |
| 4,109,024 | 8/1978 | Cremer. | |
| 4,122,198 | 10/1978 | Wisdom et al. | 426/808 X |
| 4,126,706 | 11/1978 | Hilton. | |
| 4,135,004 | 1/1979 | Finkel. | |
| 4,140,801 | 2/1979 | Hilton et al. | |
| 4,163,804 | 8/1979 | Meyer et al. | |
| 4,167,588 | 9/1979 | Willard. | |
| 4,170,659 | 10/1979 | Totino et al. | |
| 4,208,476 | 6/1980 | Tsao. | |
| 4,238,517 | 12/1980 | Bosley, Jr. et al. | |
| 4,266,920 | 5/1981 | Hayashi et al. | |
| 4,272,554 | 6/1981 | Schroeder et al. | |
| 4,277,510 | 7/1981 | Wicklund et al. | |
| 4,293,582 | 10/1981 | Hamann et al. | 426/808 X |
| 4,312,892 | 1/1982 | Rubio. | |
| 4,326,455 | 4/1982 | Rubio. | |
| 4,362,754 | 12/1982 | Wenger et al. | |
| 4,409,250 | 10/1983 | Van Hulle et al. | |
| 4,418,088 | 11/1983 | Cantenot. | |
| 4,439,459 | 3/1984 | Swartley. | |
| 4,446,163 | 5/1984 | Galle et al. | |
| 4,455,321 | 6/1984 | Glabe. | |
| 4,505,942 | 3/1985 | Ito et al. | |
| 4,508,739 | 4/1985 | Ryan. | |
| 4,517,204 | 5/1985 | Mottur et al. | |
| 4,526,800 | 7/1985 | Howard. | |
| 4,528,202 | 7/1985 | Wang et al. | |
| 4,537,786 | 8/1985 | Bernard. | |
| 4,555,409 | 11/1985 | Hart. | |
| 4,560,569 | 12/1985 | Ivers | 426/560 X |
| 4,567,051 | 1/1986 | Baker et al. | |
| 4,568,557 | 2/1986 | Becker et al. | |
| 4,609,557 | 9/1986 | Mao et al. | |
| 4,615,901 | 10/1986 | Yoshioka et al. | |
| 4,623,548 | 11/1986 | Willard. | |
| 4,623,550 | 11/1986 | Willard. | |
| 4,640,843 | 2/1987 | Matuszak et al. | |
| 4,645,679 | 2/1987 | Lee, III et al. | 426/560 |
| 4,650,687 | 3/1987 | Willard et al. | |
| 4,749,579 | 6/1988 | Haydock et al. | |
| 4,752,493 | 6/1988 | Moriki. | |
| 4,767,633 | 8/1988 | Fowler. | |
| 4,769,253 | 9/1988 | Willard. | |
| 4,770,891 | 9/1988 | Willard. | |
| 4,803,091 | 2/1989 | Mottur et al. | |
| 4,834,996 | 5/1989 | Fazzolare et al. | |
| 4,855,151 | 8/1989 | Fielding. | |
| 4,861,609 | 8/1989 | Willard et al. | |
| 4,863,750 | 9/1989 | Pawlak et al. | |
| 4,873,093 | 10/1989 | Fazzolare et al. | |
| 4,876,101 | 10/1989 | Willard. | |
| 4,879,126 | 11/1989 | Willard et al. | |
| 4,880,371 | 11/1989 | Spinelli et al. | |
| 4,889,733 | 12/1989 | Willard et al. | |
| 4,889,737 | 12/1989 | Willard et al. | |
| 4,929,461 | 5/1990 | Schonauer et al. | |
| 4,938,982 | 7/1990 | Howard. | |
| 5,061,507 | 10/1991 | Aulik et al. | |
| 5,104,673 | 4/1992 | Fazzolare et al. | |
| 5,147,675 | 9/1992 | Gage et al. | |
| 5,320,858 | 6/1994 | Fazzolare et al. | |
| 5,429,834 | 7/1995 | Addesso et al. | 426/808 X |
| 5,500,240 | 3/1996 | Addesso et al. | 426/560 |

BAKED POTATO-BASED CHIP-LIKE SNACK FOODS AND METHOD OF PREPARING

RELATED APPLICATIONS

This is a continuation of application Ser. No. 08/257,814, filed Jun. 8, 1994, now U.S. Pat. No. 5,554,405 which is a continuation of application Ser. No. 07/848,889, filed Mar. 10, 1992, now U.S. Pat. No. 5,320,858, which is a continuation of application Ser. No. 07/310,096, filed Feb. 14, 1989, now U. S. Pat. No. 5,104,673, which is a continuation of application Ser. No. 07/062,673, filed Jun. 16, 1987, now U.S. Pat. No. 4,834,996, which is a continuation-in-part of application Ser. No. 06/772,918, filed Sep. 5, 1985, now U.S. Pat. No. 4,873,093, which in turn is a continuation-in-part of application Ser. No. 06/681,647, filed Dec. 14, 1984, now abandoned.

FIELD OF THE INVENTION

The invention relates to a continuous process for preparing bakery snacks having a chip-like texture. In particular this invention relates to a product and a process for preparing a baked snack food from starch-containing ingredients.

BACKGROUND OF THE INVENTION

Snack items include a wide variety of foods including potato chips, corn chips, puffed dough articles, cookies and crackers. Processed snack foods are generally provided to the consumer in a ready-to-eat form. Food snacks are generally eaten separately from regular meals or used to supplement a meal.

Snack foods include chip products and crackers. Chip products are frequently made from wheat or other starch-containing ingredients that are deep fat fried. Examples of chip products include corn chips and potato chips. Crackers are usually baked products and have a high content of wheat or other gluten containing flour and non-gluten flour that can form a dough. Cracker dough is machined during its processing and is baked dry or to a water content, that provides the final chip product with a crispy texture.

The ingredients used to make corn chips or potato chips have little or no gluten and consist essentially of starch. A hydrated starch or gelatinous composition without gluten typically does not form a machinable dough. For this reason starchy materials such as corn flour, or potato flour are not used to make crackers. The dough used to make crackers must have enough strength that it can be stretched during machining or sheeting and laminating. Typically, starchy materials such as corn flour and potato flour when mixed with water do not form a dough that is "workable" or machinable or sheetable. Most snack foods produced from starchy materials must be extruded to form a final product or mixed with a gluten-containing flour to form a dough that can be machined and baked into a final product.

Most baked snack products which are made from starchy materials are prepared initially by forming a composition from water and starch flour. Seasonings and flavorings can be added to the composition. The dough composition is then extruded. The extruded composition is cut and dropped onto a belt or tray and transported to an oven for baking. After baking, the snack food is further dried or cooked to allow for the extraction of as much moisture as possible. The extruded or otherwise shaped starch composition can alternatively be deep fried instead of baked to make the final product crispy. There are many other variations on this basic procedure and compositions used.

U.S. Pat. No. 4,528,202 to Wang et al discloses a process for making shredded potato products. The invention of this patent forms a potato starch and water dough mass which is then tempered to obtain an even water distribution. The dough mass is then shredded and the resulting shredded dough pieces are baked. This patent does not disclose a method wherein a dough is produced from potato starch that can be machined according to the practice in cracker technology.

U.S. Pat. No. 4,455,321 to Glabe discloses a snack food prepared from an extrudable mixture of dehydrated potato flour, baking powder, mono- and diglycerides of fatty acids, and water. The mixture is formed into a dough, extruded, and cut. The cut dough pieces are then baked. This patent discloses a process for producing a starchy dough product which is a shaped, hollow potato snack. The process does not involve machining a workable dough in a fashion similar to that used in cracker technology.

U.S. Pat. No. 3,600,193 to Glabe discloses a process for preparing a snack food product that includes the steps of mixing ungelatinized corn flour and gelatinized corn flour together with seasonings such as tapioca starch, milk solids, sodium chloride, starch phosphate, and other flavoring materials. These ingredients are mixed to form a dough and then extruded. The extruded dough is shaped as desired and cut into pieces. The cut dough pieces are steamed at between 190° F. and 210° F. The steamed dough is dried and deep fat fried in vegetable oil at a temperature between 390° F. and 400° F. This process involves the step of extruding the dough before steaming. The product of this process is not a baked snack food.

U.S. Pat. No. 3,922,370 to Prakash discloses a process for producing a snack product from a dough formed by mixing together water and a dry mix of ungelatinized rice, rice flour, modified starch, and flavorings. The dough is shaped into separate pieces and steamed at a temperature between 95° C. and 100° C. The steaming of the dough gelatinizes the starch contained in the dough. The steamed product is dried in two successive steps. The product is then deep fat fried at between 180° C. and 230° C. for 4 to 14 seconds to yield a rice snack. The product of this process is not a baked snack food.

U.S. Ser. No. 3,348,950 to Weiss discloses a process for making a snack food product by first mixing together corn, sucrose, water, and flavor developing ingredients. This mixture is combined with a second mixture of yellow corn grits, water, and sodium bicarbonate. The combined mixture is precooked under pressure at temperatures between 247° F. and 259° F. and at a pressure of 14 to 20 pounds per square inch. The gelatinized dough is shaped and dried. Dough pieces are formed and deep fat fried. This process does not produce a baked snack food.

U.S. Pat. No. 1,039,912 to Dollings discloses a granular food product made of a wheat flour dough. The dough is successively boiled, baked, dried, and granulated. The formulas disclosed for this snack food can include limited quantities of corn flour.

U.S. Pat. No. 2,505,407 to Johnson discloses a process for making rye products that comprises forming a batter primarily of rye flour, extruding the batter to form dough pieces, baking the dough pieces, and dehydrating the dough pieces to a desired degree of crispness.

U.S. Pat. No. 3,753,729 to Harms et al discloses a process for preparing a food snack from a corn starch material in combination with an oleaginous material and water. This mixture is extruded under pressure at 350 to 500 pounds per square inch at temperatures above 100° C. to form a "puffed" ready-to-eat product. This process does not apply steam directly to the dough and requires specific abrasion characteristics for the starch material to form the dough. This process does not produce a baked chip-like snack food.

U.S. Pat. No. 4,418,088 to Cantenot discloses a process wherein roasted corn flour, wheat flour, sugar, and salt are mixed together. The mixture is shaped, extruded, and baked between 140° C. and 155° C. It is then cooled immediately and toasted. This process does not produce a baked snack food having a chip-like texture.

The present invention provides a process for the continuous production of a low-fat content, baked chip-like snack food from a sheeted dough. Starchy ingredients are processed in a cooker extruder to obtain a workable or machineable dough-like composition that can be machined or sheeted and processed according to cracker technology to produce the baked, chip-like snack food.

SUMMARY OF THE INVENTION

The process of this invention comprises the steps of mixing at least one ingredient having starch with water to form a composition. The water may be added in the form of tap water, or heated water, either alone or in combination with steam to provide hydration of the starch-containing ingredient. Heating of the composition then is performed with continued mixing for a sufficient amount of time to form a machinable dough-like consistency. The mixing and heating are performed continuously in a cooker extruder.

The heating may be accomplished by direct steam injection, by indirect heating or heating jackets, or a combination of direct steam injection and indirect heating. The wetted dry ingredient composition is heated to a temperature of from about 130° F. to about 260° F. and at a pressure of less than about 250 psia, typically from about 25 psia to about 125 psia. The heated composition is extruded to avoid substantial expansion and to obtain an extrudate having a moisture content of from about 25% by weight to about 60% by weight, typically less than or equal to 50% by weight, preferably from about 35% to about 43% by weight based upon the weight of the extrudate.

The dough-like composition is machined by any of a number of conventional means including those means used in cracker technology. The dough may be sheeted while hot, typically at a temperature of at least about 110° F. The sheeted dough is laminated, the laminate is reduced in thickness, cut into pieces, and the pieces are then baked to obtain a chip-like texture.

The starch component of this invention can include any ingredient having starch such as any commercially available native or modified cereal, root, or leguminous starch, partially or completely gelatinized starch, dried or dehydrated potato product including potato flour, potato granules, and potato flakes, corn flour, corn meal, buckwheat flour, rice flour, barley flour, tapioca, and mixtures of these. Typically, the at least one ingredient comprising starch is at least about 35% by weight of the extrudate. Alternative embodiments of the starch component can include a gluten-containing starch ingredient such as wheat flour, rye flour, sorghum flour, graham flour, and mixtures of these.

The machining processes used in this invention can include cracker machining, which involves laminating, reduction rolling, and cutting, and tortilla machining. The baking used in this invention is usually performed with convection heating, however dielectric energy applications can be used as a post-baking process to further the drying of the product.

An embodiment of the method of this invention uses starch ingredients that are mixtures of a nongluten-containing ingredient and a wheat or other gluten-containing flour.

A post-bake spray oil application is optional and included in the preferred embodiment. The preferred embodiment of the invention produces a thin, crisp snack food in which the dough laminae are partially separated during baking and form "blister like" formations, distributed over the surface of the snack An alternative embodiment produces a flat unblistered snack food product. This product is a baked snack food product that can have the appearance of a "chip" product such as a potato chip.

DETAILED DESCRIPTION OF THE INVENTION

The gelatinized starch snack foods of this invention are prepared from conventional starchy materials or ingredients having starch. Commercially available native or modified cereal, root, or leguminous starches, and partially or completely gelatinized starches and ingredients containing them may be used. Preferred embodiments are made from dried or dehydrated potato products such as a mixture of potato flour and potato flakes or a mixture of potato flour and potato granules. Desirable alternative embodiments can be made from potato flour, potato flakes, potato granules, corn flour, and corn meal, and other ingredients either used separately or in various combinations. Each of these ingredients has a high starch content, but is absent of gluten. When mixed with water these ingredients have no elasticity because of their lack of gluten. The inability to stretch makes the wet compositions prepared from these ingredients unsuitable for conventional handling and machining as used in cracker technology.

Other starch-containing ingredients can be used in alternative embodiments of this invention. Examples of other non-gluten, starch-containing ingredients include buckwheat flour, rice flour, barley flour, tapioca, and mixtures of these. Non-gluten, starch-containing ingredients can also be blended with gluten-containing ingredients to vary the flavor and/or texture of the final product. Gluten-containing ingredients which can be used include wheat flour, rye flour, sorghum flour, and graham flour.

Corn germ can be added to the dough composition in small quantities to modify the flavor and texture of the final product. Corn germ is a by-product of milling corn and gives a starchy snack food product a sweet flavor and crunchy texture. Corn germ added in an amount up to 20 percent by weight of the total ingredients having starch can be used to enhance the flavor of the final product.

Vegetable shortening or oil, or fat can also be present preferably in an amount less than 20 percent by weight of the finished product. The amount may suitably be less than 10% of the finished product, however higher amounts tend to avoid a dry mouthfeel. Usually less than 2 percent of the oil used in this process is mixed into the snack food ingredients. The remainder of the oil is applied topically to the machined and cut pieces before baking or to the final product after baking. Vegetable shortening and oil are used to modify flavor and texture of the final product. The vegetable shortening or oil mixed into the composition is preferably added to the dough-like composition resulting after heating or steaming.

Other ingredients, not containing starch, may be used to make snack foods according to this invention. Salt can be present in amounts between about 1 to about 2 percent of the total starch flour composition or final product. Sugar can be added to sweeten the final product in an amount of about 2 to 3 percent of the total starch flour composition or final product. Leavening agents are not required, but small amounts of yeast products can be added to flavor a product. Suitable amounts of a leavening agent, such as sodium bicarbonate, or yeast products which can be used range up to from about 1% to about 2% by weight of the final product.

Flavoring ingredients are an important consideration in making any snack product and can vary widely. More common flavoring ingredients include onion, garlic, bacon, chicken, beef, cheese, ham, peanut butter, nuts and seeds, vanilla, chocolate products, spices, and others. These flavoring ingredients can be blended into the composition or sprinkled upon the dough-like composition before or after baking. Blends of flavoring ingredients can be used as toppings or "sandwich filling" materials can be used with the product of this invention.

In preparing the composition including an ingredient having starch all dry and minor ingredients are blended together. Certain minor ingredients such as salt or sodium bicarbonate can be dissolved before being mixed into the composition of ingredients. The one or more ingredients having starch are fed to an extruder, or a continuous mixer and blended with a sufficient amount of feed water to form a wet starchy mass or composition. In forming this wetted dry ingredient composition a vegetable oil shortening, such as soybean oil, may also be used. The liquid ingredients are added downstream of the dry ingredients. The starch ingredients, water, and minor ingredients are mixed until a wet starchy mass or composition is obtained. This composition has a nonelastic consistency similar to mashed potatoes. This composition is then subjected to heating with further mixing in the extruder or continuous mixer. Shortening may be added downstream of the feed water addition during or after application of the heat. Mixing is continued to assure uniform incorporation of the ingredients into the dough. After sufficient mixing, working, and heating the composition forms a "dough-like" consistency. This dough-like consistency is comparable to the elastic, machinable doughs that can be formed from gluten-containing ingredients such as wheat flour. The reasons that the "starch components" or ingredients having starch develop this dough-like consistency upon heating are not well understood. Certain ingredients having starch such as corn flour and corn meal contain ungelatinized starch that is gelatinized upon heating or steaming. With these ingredients the formation of gelatinized starch is believed to be at least partially responsible for the formation of the dough-like consistency of the heated, starch components.

Other ingredients such as potato flour and potato flakes contain starch that is substantially, completely pregelatinized. With these starch components the degree of cell rupturing causing the release of hydrated, gelatinized starch affects the formation of the dough-like consistency of the heated and worked composition. The released, gelatinized starch molecules interact with one another to impart a dough-like consistency to the composition.

The degree of dough-like consistency in a heated or steamed composition can be determined by a Voland Texturmeter. This device measures compressibility or resistance to force of compositions in units defined by the Leatherhead Food Research Association. These units are termed "LFRA". A high LFRA is produced by a dry and hard composition and a low LFRA is produced by a fluid and soft composition. Desirable dough-like compositions using potato ingredients have LFRA measurements between about 150 and about 250 with an LFRA of 200 being the most desirable. Other ingredients having starch can vary in the desirable ranges of LFRA.

Desirable LFRA measurements can be produced with steamed compositions wherein the ingredient having starch is a potato ingredient, when there is between about 10 and 75 percent cell rupture of the potato ingredient. The most desirable LFRA measurements are obtained with potato ingredients having between 25 and about 75 percent cell rupture upon steaming. Other ingredients vary in their relationship between desireable LFRA measurements and the degree of cell rupturing. Additionally, cell rupturing is not the only factor affecting the development of a dough-like consistency in the heated or steamed compositions of this invention. The working or energy input provided by the mixing, conveying, shearing, and blending in the extruder at relatively low temperatures and pressures contributes to the formation of a dough-like consistency suitable for continuous sheeting. The working of the composition should be such so as to avoid substantial destruction of amylopectin molecules.

The water may be added in the form of tap water, heated water, or boiling water, either alone or in combination with steam to provide hydration of the starch-containing ingredient. Feed water temperatures from about 60° F. to about 180° F. are suitable. The use of direct steam injection aids in heat transfer to the ingredients and generally reduces residence times in the extruder. Residence times of the starch ingredient generally range from about 5 seconds to about 5 minutes, preferably from about 90 seconds to about two and one half minutes. The residence time used will depend upon the energy input, screw configuration, temperatures and pressures, and ingredients used.

The heating may be accomplished by direct steam injection, by indirect heating or heating jackets, or a combination of direct steam injection and indirect heating. The wetted dry ingredient composition is heated to a temperature of from about 130° F. to about 260° F. In the preparation of potato-based snack foods, the wetted dry ingredient composition is preferably heated to from about 160° F. to about 205° F.

The wetted dry ingredient composition is heated at a pressure of less than about 250 psia, typically from about 25 psia to about 125 psia. The heated composition is extruded to avoid substantial expansion and to obtain an extrudate having a moisture content of from about 25% by weight to about 60% by weight, typically less than or equal to about 50% by weight, preferably from about 35% to about 43% by weight based upon the weight of the extrudate.

The mixture which forms the dough-like composition is desirably subjected to steam supplied at a temperature of about 212° F. at, for example, a supply pressure of about 40 to about 45 pounds per square inch. Superheated steam at temperatures above 212° F. can be effective for use in this invention as well as lower steam supply pressures. The steaming temperatures and pressures can vary depending on the equipment used. As the steam contacts the colder composition the steam condenses.

If too much water is added via the feed water and during the optional steaming process the resultant dough is too "tacky" and can not be machined. If too small an amount of water is added the dough remains too powdery and also can not be machined. Typically, the steaming process adds approximately 3 percent to the total water content of the dough.

In many starch snack foods water can be added during the steaming of the composition to simultaneously hydrate the starch and ensure complete gelatinization of the starch. The moisture from the steam is used to form a dough-like consistency from the ingredients forming the composition. With some ingredients having starch, this alternative method results in lumping and prevents the formation of a homogenous composition having a dough-like consistency. Potato ingredients are examples of ingredients having starch that tend to lump in this alternative process. However, the working provided by the extruder substantially eliminates this lumping problem.

The mixed, heated dough-like composition is then subjected to machining. The dough-like composition has a rubbery consistency and is semitransparent when sheeted. Typically, the dough composition or extrudate contains the at least one ingredient comprising starch in an amount of at least about 35% by weight of the extradate. The dough composition from the extruder is suitably sheeted while hot. The dough temperature is typically at least about 110° F., generally about 20° F. less than its extruder outlet temperature when it is sheeted.

Various machining processes can be used. Machining can include the processes used in standard cracker technology. Alternative machining processes include the use of a tortilla machine in which the dough-like composition is rolled and formed into pieces without being laminated. A preferred machining process is outlined below.

The steamed dough-like composition is formed into a sheet by gauge or reduction rollers and enters a dough laminating machine. The laminating operation can be performed by overlapping lamina of about one-fourth inch thickness each such that one sheet is placed upon another. Typically, between 3 to 6 laminae are layered together during this operation. The laminate is preferably formed by folding the sheeted dough upon itself. However, separate dough sheets may be used to form a laminate.

The laminated dough-like composition is then reduced in thickness. Reduction of the dough mass is performed in stages. For example, after the three laminas are formed into a sheet, the sheet is then compressed to about one-sixteenth inch. A final reduction in thickness is done by a gauge roller. The dough is reduced during this operation to a final thickness of about 1/32 of an inch. At this point, the sheet generally has a width to thickness ratio of at least about 350.

The machined dough-like composition is then cut into dough pieces. The dough temperature at the cutter is typically at least about 90° F. Cutting can be performed by a reciprocating cutter, a rotary cutter, or other dough cutting mechanisms. The cut pieces in the preferred embodiment are circular in shape with a diameter of about one and three-quarter inches. Topping salt can be added at about 1 to 2 percent of the final product weight.

Dockering or piercing the uncut sheet or cut pieces can optionally be included in the machining operation. Dockering decreases the occurrence of "checking" or the formation of undesirable stress lines that cause breakage in the final product. The cut pieces are then conveyed or transported to a convection oven for baking.

The dough pieces may be baked in a conventional band oven having several temperature zones. Suitable baking temperatures range from about 325° F. to about 650° F. for about 2 minutes to about 7 minutes. A temperature of between about 600° F. to about 650° F. for a total baking time of about 2 to 3 minutes may be used, for example. The fast application of the higher heats yields a rapid formation of steam within the pieces. Steam, present within the pieces, gives rise to blister formations as the pieces are being baked. This is due to the exterior portions of the pieces drying and trapping steam formed in the internal portion of the pieces. As the steam forms under an external layer, it performs a function similar to the leavening agent and causes expansion of the dough-like composition. Irregular, curled configurations of a piece can occur. In the preferred embodiment, which uses circular or disc shaped pieces, the final product has a "blistered cracker" appearance.

An alternative embodiment occurs when an application of spray oil is applied to the piece before baking. During baking, the oil prevents the exterior layer of the piece from drying completely before the moisture in the interior of the piece is released. As a result the piece remains flat. The initial application of oil allows for the uniform drying of the entire dough piece during baking. This product has a potato chip-like appearance.

After conventional baking, the dough pieces can be further dried by a dielectric energy application which disperses the moisture present within the piece and decreases its total moisture. The application of dielectric energy can also be useful in reducing checking, which is the formation of stress lines caused by uneven concentrations of moisture in the internal portion of the piece after baking. Additionally, drying after baking can be performed by the application of low heat and forced air around the pieces. After baking and drying it is beneficial to spray the pieces with oil. This provides for a more palatable, less dry product.

The moisture concentration after baking of the pieces is important to the product of this invention. Typically, after the final drying step, a wheat cracker contains approximately 1.5 to 3.5 percent total moisture. The snack foods of this invention, because of their high starch concentration, are not crisp at the final higher moisture contents acceptable for some crackers. For products according to this invention an acceptable total moisture content after baking and drying is between 0.5 and 6.0 percent by weight, typically less than about 3% by weight. The water activity of the products of the present invention are less than 0.7. This moisture content must be kept low throughout the handling and shipping of this product. Packaging of this product is best accomplished in a vapor proof material.

Suitably, the snack products of the present invention contain the at least one starch ingredient in an amount of at least about 65% by weight, for example at least about 68% by weight, typically at least about 80% by weight, based upon the weight of the final product.

Other alternative embodiments of this invention can include the use of potato flour made from unpeeled potatoes. By leaving the potato skin on the potatoes in preparing the flour, an "earthy" flavor can be obtained for the final product. Additionally, potato pieces or potato flakes can be used to slightly vary the final texture of the product.

When using corn flour in this invention, the corn flour can be enhanced by including masa corn flour, corn germ, or corn grits. These ingredients are particularly desirable when oil is applied to the pieces prior to baking. The final product has the taste of a baked tortilla or taco shell and has a similar texture. It is also useful when using a corn blend for the dough-like composition to include approximately 1 percent sugar to compensate for some of the bitterness present in corn ingredients.

The use of small particulate matter interspersed in the dough disrupts the homogenous, amorphous structure of the corn composition described above. When masa corn, corn germ, or corn grits are used with corn flour, the tortilla cracker looses its normal texture and instead of being hard, glassy, brittle, or dense, the final product is less dense and has more air pockets. This produces a softer product, but the product is more crunchy than when made of only a corn flour.

In the preferred embodiment of this invention more than one ingredient having starch is used to form the snack food composition. Potato flakes or potato granules with potato flour are used in the preferred embodiment with tapioca starch. This mixture produces a final product having a desirable texture and flavor. This mixture also produces less problems with checking than do products produced from potato compositions not having an ungelatinized starch component or ingredient.

The following examples illustrate the present invention wherein all parts, percentages, and ratios are by weight, and all temperatures are in ° F. unless indicated to the contrary:

EXAMPLE 1

The ingredients, their relative amounts, and their relative mass flow rates used to prepare a dough which can be used for producing a low fat content potato-based snack having a blistered, curled, potato chip-like appearance and chip-like texture were:

| Ingredient | Weight % | Feed Rate (lbs./min) |
|---|---|---|
| Component 1 - Dry Mix | | |
| Potato granules | 50.0 | 1.32 |
| Corn starch, ungelatinized | 11.0 | 0.29 |
| Minor ingredients (potato flour, sugar, salt, sodium bicarbonate) | 4.3 | 0.11 |
| Component 2 - Oil Slurry | | |
| Soybean oil and emulsifier | 0.6 | 0.016 |
| Component 3 - Feed Water | | |
| Tap water (about 60° F.) | 34.1 | 0.90 |
| | 100.00 | |

Component 1 is prepared by mixing the dry ingredients to obtain a substantially homogeneous dry blend. The dry blend is continuously fed to the inlet end of a corotating twin screw cooker extruder. The feed water solution is continuously fed to the extruder downstream of the dry ingredients. The oil slurry is continuously fed to the extruder downstream of the feed water. Paddles and screws were arranged on the screw shafts from upstream to downstream to provide: a) blending and mixing of the dry ingredient mixture with the feed water, b) mixing and conveying of the wetted dry ingredient composition during heating and, c) mixing and conveying of the heated composition with further heating and cooking to the exit of the extruder to form a machinable, dough-like consistency. The dough is extruded from the extruder outlet without the use of a die. The screws were rotated at about 300 rpm, at about 26% of maximum torque. On a calculated basis, the water content of the dough formed in the extruder was about 38% by weight.

The extruder had five jacketed zones for controlling the temperature of the ingredients in the extruder. Each zone contained a temperature probe for contact with the ingredients in the extruder. The average measured temperatures were, at about steady-state, from upstream to downstream: a) about 90° F. in the zone for mixing the dry ingredients and the feed water, b) about 97° F., 102° F., 104° F., and 126° F. in the zones for mixing, conveying, and heating of the wetted dry ingredient composition. The average temperature of the dough coming out of the barrel of the extruder was about 154° F. The average pressure immediately prior to the exit orifice was about 11 psig. The residence time of the dry ingredients in the extruder is about 3 to 4 minutes.

The extruded product, in cylindrical or rope form may then be continuously fed to reduction rollers to farm a continuous sheet of about one-fourth of an inch in thickness. The sheet may then be laminated into three laminae by folding the sheet upon itself using conventional cracker laminating equipment. The laminated dough may then be reduced in thickness in two stages to a thickness of about 1/32 of an inch using reduction rollers. The laminate may then be cut into circular shaped pieces using a reciprocating cutter. The pieces may be salted and then conveyed through a conventional convection oven having a plurality of zones. The oven temperatures for baking of the pieces may be about 410° F. in the first zone and about 340° F. in the exit zone. The residence time of the pieces in the oven may be about three minutes for baking the pieces to a moisture content of about 2.5% by weight and a water activity of less than about 0.7.

EXAMPLE 2

A potato chip-like product may be produced as in Example 1 except: a) steam may be continuously injected into the wetted dry ingredient composition to heat it and to increase the moisture content of the extrudate to about 41% by weight, and b) the residence time of the dry ingredients may be reduced to about 1 to 2 minutes. The steam may be supplied at 212° F. and 45 pounds per square inch of supply pressure.

EXAMPLE 3

The ingredients and their relative amounts, which may be used for producing a low fat content corn flavored chip in accordance with the extrusion process of Example 1 are:

| Ingredient | Weight % |
|---|---|
| Component 1 - Dry Mix | |
| Corn flour (about 10% moisture) | 56.0 |
| Sugar | 1.4 |
| Salt | 0.3 |
| Sodium bicarbonate | 0.3 |
| Component 2 - Oil Slurry | |
| Vegetable Oil | 1.0 |
| Component 3 - Feed Water | |
| Hot water (about 180° F.) | 41.0 |
| | 100.0 |

What is claimed is:

1. A baked starch-based snack consisting essentially of at least about 68% by weight, based upon the weight of the snack, of a blend of a gelatinized corn starch and at least one starch-containing ingredient selected from the group consisting of dried potato products, said snack being produced by baking a sheeted dough having a plurality of laminae to obtain a crisp, chip-like texture, and a thin, flat chip-like appearance or a thin, partially delaminated, blistered chip-like appearance, said blistered appearance being present over the surface of said snack.

2. A baked starch-based snack as claimed in claim 1 which further comprises wheat flour.

3. A starch-based snack as claimed in claim 1 wherein said laminated dough has between 3 to 6 laminae.

4. A starch-based snack as claimed in claim 1 wherein said at least one starch-containing ingredient is potato flakes.

5. A starch-based snack as claimed in claim 1 wherein the amount of shortening or fat is less than 10% by weight.

6. A starch-based snack as claimed in claim 1 wherein the amount of said blend is at least about 80% by weight, based upon the weight of the snack.

7. A starch-based snack as claimed in claim 1 wherein said sheeted dough has a thickness of about 1/32 of an inch.

8. A starch-based snack as claimed in claim 1 wherein said sheeted dough is baked to obtain said thin, flat chip-like appearance.

9. A starch-based snack as claimed in claim 1 wherein said sheeted dough is baked to obtain said thin, partially delaminated, blistered chip-like appearance, said blistered appearance being present over the surface of said snack.

10. A starch-based snack as claimed in claim 1 wherein said at least one starch-containing ingredient is selected from the group consisting of potato flour and potato flakes.

11. A baked starch-based snack consisting essentially of gelatinized corn starch and at least one starch-containing ingredient selected from the group consisting of dried potato products said snack being produced by baking a sheeted dough having a plurality of laminae to obtain a crisp, chip-like texture, and a thin, flat chip-like appearance or a thin, partially delaminated, blistered chip-like appearance.

12. A starch-based snack as claimed in claim 11 wherein said sheeted dough is baked to obtain said thin, flat chip-like appearance.

13. A starch-based snack as claimed in claim 11 wherein said sheeted dough is baked to obtain said thin, partially delaminated, blistered chip-like appearance, said blistered appearance being present over the surface of said snack.

14. A starch-based snack as claimed in claim 11 wherein said at least one starch-containing ingredient is selected from the group consisting of potato flour and potato flakes.

15. A method for producing a baked potato-based snack comprising admixing ingredients consisting essentially of gelatinized corn starch and at least one starch-containing ingredient selected from the group consisting of dried potato products to form a dough, forming the dough into a sheet, forming the sheet into a laminate, cutting the laminate into pieces, and baking said pieces to obtain a potato-based snack having at least about 68% by weight of gelatinized corn starch and said at least one starch-containing ingredient, based upon the weight of the snack, a crisp, chip-like texture, and a thin, flat chip-like appearance or a thin, partially delaminated, blistered chip-like appearance, said blistered appearance being present over the surface of said snack.

16. A method as claimed in claim 15 herein said laminated dough has between 3 to 6 laminae.

17. A method as claimed in claim 15 wherein the amount of shortening or fat is less than 10% by weight.

18. A method as claimed in claim 15 wherein said at least one starch-containing ingredient is selected from the group consisting of potato flour and potato flakes.

19. A baked starch-based snack consisting essentially of gelatinized corn starch and at least one starch-containing ingredient selected from the group consisting of dried potato products, and less than 10% by weight-of-shortening or fat, said snack being produced by baking a sheeted dough to obtain a crisp, chip-like texture, and a thin, flat chip-like appearance or a thin, partially delaminated, blistered chip-like appearance.

20. A starch-based snack as claimed in claim 19 wherein said at least one starch-containing ingredient is selected from the group consisting of potato flour and potato flakes.

21. A starch-based snack as claimed in claim 19 wherein said sheeted dough has a thickness of about 1/32 of an inch.

22. A starch-based snack as claimed in claim 19 wherein said sheeted dough is baked to obtain said thin, flat chip-like appearance.

23. A starch-based snack as claimed in claim 19 wherein said sheeted dough is baked to obtain said thin, partially delaminated, blistered chip-like appearance, said blistered appearance being present over the surface of said snack.

24. A starch-based snack as claimed in claim 19 wherein said sheeted dough is laminated and has between 3 to 6 laminae.

25. A starch-based snack as claimed in claim 19 further including at least one member selected from the group consisting of wheat flour, sugar, salt, and leavening agents.

26. A method for producing a baked potato-based snack comprising admixing ingredients consisting essentially of water, gelatinized corn starch and at least one starch-containing ingredient selected from the group consisting of dried potato products to form a dough, forming the dough into a sheet, cutting the sheet into pieces, and baking said pieces at a temperature which yields a rapid formation of steam within the pieces sufficient to give rise to blister formations as the pieces are being baked, wherein said baking results in a potato-based snack having less than about 10% by weight of shortening or fat, a crisp, chip-like texture, and a thin, flat chip-like appearance or a thin, partially delaminated, blistered chip-like appearance.

27. A method as claimed in claim 26 wherein said at least one starch-containing ingredient is selected from the group consisting of potato flour and potato flakes.

28. A method as claimed in claim 26 wherein the dough is sheeted to a thickness of about 1/32 of an inch.

29. A method as claimed in claim 26 wherein the dough sheet is baked to obtain said thin, flat chip-like appearance.

30. A method as claimed in claim 26 wherein the dough sheet is baked to obtain said thin, partially delaminated, blistered chip-like appearance, said blistered appearance being present over the surface of said snack.

31. A method as claimed in claim 26 wherein the dough sheet is laminated and has between 3 to 6 laminae.

32. A method as claimed in claim 26 wherein said formed dough further includes at least one member selected from the group consisting of wheat flour, sugar, salt, and leavening agents.

33. A baked starch-based snack consisting essentially of at least about 80% by weight, based upon the weight of the snack, of a blend of a gelatinized corn starch and at least one starch-containing ingredient selected from the group consisting of dried potato products, and less than about 10% by weight of shortening or fat, said snack being produced by baking a sheeted dough to obtain a crisp, chip-like texture, and a thin, flat chip-like appearance or a thin, partially delaminated, blistered chip-like appearance.

34. A starch-based snack as claimed in claim 33 wherein said at least one starch-coming ingredient is selected from the group consisting of potato flour and potato flakes.

35. A starch-based snack as claimed in claim 33 wherein said sheeted dough has a thickness of about 1/32 of an inch.

36. A starch-based snack as claimed in claim 33 wherein said sheeted dough is baked to obtain said thin, flat chip-like appearance.

37. A starch-based snack as claimed in claim 33 wherein said sheeted dough is baked to obtain said thin, partially delaminated, blistered chip-like appearance, said blistered appearance being present over the surface of said snack.

* * * * *